(12) United States Patent
Lee et al.

(10) Patent No.: US 11,585,175 B2
(45) Date of Patent: Feb. 21, 2023

(54) ACTUATOR WITH PORT

(71) Applicant: HALLIBURTON ENERGY SERVICES, INC., Houston, TX (US)

(72) Inventors: Shao Hwa Lee, Singapore (SG); Mine Kazanci, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 446 days.

(21) Appl. No.: 15/779,791

(22) PCT Filed: Jan. 20, 2016

(86) PCT No.: PCT/US2016/013997
§ 371 (c)(1),
(2) Date: May 29, 2018

(87) PCT Pub. No.: WO2016/118553
PCT Pub. Date: Jul. 28, 2016

(65) Prior Publication Data
US 2018/0328149 A1 Nov. 15, 2018

(51) Int. Cl.
*E21B 27/00* (2006.01)
*E21B 27/02* (2006.01)
(Continued)

(52) U.S. Cl.
CPC .............. *E21B 27/005* (2013.01); *B01J 8/001* (2013.01); *B01J 8/006* (2013.01); *B01J 8/222* (2013.01);
(Continued)

(58) Field of Classification Search
CPC ........ E21B 49/081; E21B 41/00; E21B 27/02; E21B 27/005
See application file for complete search history.

(56) References Cited

U.S. PATENT DOCUMENTS 3,123,142 A * 3/1964 Quinn et al. .......... E21B 49/082
166/169
5,896,924 A 4/1999 Carmody et al.
(Continued)

OTHER PUBLICATIONS

International Search Report and Written Opinion; PCT Application No. PCT/US2016/013997; dated Apr. 8, 2016.
(Continued)

*Primary Examiner* — Robert E Fuller
*Assistant Examiner* — Neel Girish Patel
(74) *Attorney, Agent, or Firm* — Polsinelli PC (57) ABSTRACT

An actuator is provided that includes a housing, a linear actuating shaft disposed within the housing, a piston coupled with the shaft, and a fluid barrier disposed on an end of the shaft and encircled by the piston. The piston is movable longitudinally between an extended configuration and a retracted configuration upon rotation of the shaft. The fluid barrier engages an inner surface of the piston preventing fluid communication across the fluid barrier. The fluid barrier has a shaft engaging side which receives the shaft and a fluid facing side. A cavity is formed between the piston and the fluid facing side and expands when the piston moves to the extended configuration and contracts when the piston moves to the retracted configuration. A port is disposed in the piston and extends from the cavity to external the piston thereby permitting fluid communication between the cavity and external the piston.

18 Claims, 7 Drawing Sheets

(51) Int. Cl.

| | | |
|---|---|---|
| *E21B 41/00* | (2006.01) | |
| *G01N 21/27* | (2006.01) | |
| *B01J 19/00* | (2006.01) | |
| *B01J 8/22* | (2006.01) | |
| *B01J 19/18* | (2006.01) | |
| *B01J 8/00* | (2006.01) | |
| *G01N 21/75* | (2006.01) | |
| *G01N 21/84* | (2006.01) | |
| *G01N 21/19* | (2006.01) | |
| *G01N 21/21* | (2006.01) | |
| *G01N 21/23* | (2006.01) | |
| *G01N 21/33* | (2006.01) | |
| *G01N 21/35* | (2014.01) | |
| *G01N 21/47* | (2006.01) | |
| *G01N 21/64* | (2006.01) | |
| *G01N 21/65* | (2006.01) | |
| *G01N 11/08* | (2006.01) | |

(52) U.S. Cl.
CPC ........... *B01J 8/228* (2013.01); *B01J 19/0006* (2013.01); *B01J 19/18* (2013.01); *B01J 19/1881* (2013.01); *E21B 27/02* (2013.01); *G01N 21/272* (2013.01); *G01N 21/75* (2013.01); *G01N 21/84* (2013.01); *B01J 2208/00061* (2013.01); *B01J 2208/00212* (2013.01); *B01J 2208/00362* (2013.01); *B01J 2208/00539* (2013.01); *B01J 2208/00548* (2013.01); *B01J 2208/00575* (2013.01); *B01J 2208/00628* (2013.01); *B01J 2208/00637* (2013.01); *B01J 2208/00725* (2013.01); *B01J 2208/00973* (2013.01); *B01J 2219/002* (2013.01); *B01J 2219/0004* (2013.01); *B01J 2219/0024* (2013.01); *B01J 2219/00063* (2013.01); *B01J 2219/00069* (2013.01); *B01J 2219/00072* (2013.01); *B01J 2219/00094* (2013.01); *B01J 2219/00123* (2013.01); *B01J 2219/00164* (2013.01); *B01J 2219/00168* (2013.01); *B01J 2219/00186* (2013.01); *B01J 2219/00216* (2013.01); *B01J 2219/00218* (2013.01); *B01J 2219/00225* (2013.01); *B01J 2219/00231* (2013.01); *B01J 2219/00236* (2013.01); *B01J 2219/00238* (2013.01); *B01J 2219/00243* (2013.01); *B01J 2219/00272* (2013.01); *E21B 41/00* (2013.01); *G01N 11/08* (2013.01); *G01N 21/19* (2013.01); *G01N 21/21* (2013.01); *G01N 21/23* (2013.01); *G01N 21/33* (2013.01); *G01N 21/35* (2013.01); *G01N 21/47* (2013.01); *G01N 21/64* (2013.01); *G01N 21/65* (2013.01); *G01N 2021/8416* (2013.01); *G01N 2201/12* (2013.01)

(56) References Cited

U.S. PATENT DOCUMENTS

| | | | |
|---|---|---|---|
| 6,439,307 B1* | 8/2002 | Reinhardt | E21B 49/082 166/169 |
| 2002/0043620 A1* | 4/2002 | Tchakarov | G01V 8/02 250/269.1 |
| 2003/0066646 A1* | 4/2003 | Shammai | E21B 49/10 166/264 |
| 2011/0036560 A1* | 2/2011 | Vail, III | E21B 47/01 166/87.1 |
| 2011/0259600 A1 | 10/2011 | Segura et al. | |
| 2012/0145394 A1* | 6/2012 | Jensen | E21B 29/00 166/298 |
| 2012/0273224 A1 | 11/2012 | Konschuh et al. | |
| 2013/0233547 A1* | 9/2013 | Twardowski | E21B 33/14 166/285 |
| 2014/0027105 A1* | 1/2014 | Irani | E21B 49/08 166/66.4 |
| 2014/0209301 A1* | 7/2014 | Segura | E21B 44/00 166/250.01 |
| 2015/0354280 A1* | 12/2015 | Downton | F03B 13/02 175/107 |

OTHER PUBLICATIONS

International Preliminary Report on Patentability; PCT Application No. PCT/US2016/013997; dated Aug. 3, 2017.

* cited by examiner

ACTUATOR WITH PORT

CROSS-REFERENCE TO RELATED APPLICATIONS

This application is a national stage entry of PCT/US2016/013997 filed Jan. 20, 2016, said application is expressly incorporated herein in its entirety.

FIELD

The present disclosure relates generally to actuators. In particular, the present disclosure relates to linear actuators for downhole tools.

BACKGROUND

Wellbores are drilled into the earth for a variety of purposes including accessing hydrocarbon bearing formations. A variety of downhole tools may be used within a wellbore in connection with accessing and extracting such hydrocarbons. Actuators are commonly used within downhole tools to provided motion or activate a tool. One common type of actuator is a linear actuator, where a stationary motor rotates a shaft for generating linear movement. A piston can be employed with the actuator and fluid provided to balance pressures within the actuator during motion of the piston. Oil is commonly used to provide pressure balance as the piston moves outward. The oil is stored within a compensator and provided to the rest of the downhole tool as needed.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

In the above description, reference to up or down is made for purposes of description with "up," "upper," "upward," "uphole," or "upstream" meaning toward the surface of the wellbore and with "down," "lower," "downward," "downhole," or "downstream" meaning toward the terminal end of the well, regardless of the wellbore orientation. Correspondingly, the transverse, axial, lateral, longitudinal, radial, etc., orientations shall mean orientations relative to the orientation of the wellbore or tool. The term "axially" means substantially along a direction of the axis of the object. If not specified, the term axially is such that it refers to the longer axis of the object.

Several definitions that apply throughout the above disclosure will now be presented. The term "coupled" is defined as connected, whether directly or indirectly through intervening components, and is not necessarily limited to physical connections. The connection can be such that the objects are permanently connected or releasably connected. The term "outside" or "outer" refers to a region that is beyond the outermost confines of a physical object. The term "inside" or "inner" refers to a region that is within the outermost confines of a physical object. The term "substantially" is defined to be essentially conforming to the particular dimension, shape or other word that substantially modifies, such that the component need not be exact. For example, "substantially cylindrical" means that the object resembles a cylinder, but can have one or more deviations from a true cylinder. The terms "comprising," "including" and "having" are used interchangeably in this disclosure. The terms "comprising," "including" and "having" mean to include, but not necessarily be limited to the things so described.

Disclosed herein is an actuator which utilizes external fluid, for example wellbore fluid or mud, to balance pressures when a piston is shifted linearly outward. The actuator includes a linear actuating shaft which is contained within a housing, and which may be a ball screw linear actuator. A fluid barrier can be coupled with the shaft having a seal which prevents fluid communication across the fluid barrier. The actuator also includes a fluid container, such as a compensator, that stores fluid which can be provided throughout the actuator during use, for example for lubrication or pressure balancing. The fluid stored within the compensator can be oil.

The linear actuating shaft can be rotated by a power source such as a motor. As the linear actuating shaft rotates, the power is converted from rotary power to linear power. A piston which at least partially encircles the linear actuating shaft and the fluid barrier is shifted in a longitudinal, linear direction relative to the fluid barrier. The fluid barrier engages the inner walls of the piston to prevent fluid passage. As the piston shifts longitudinally outward from a retracted configuration toward an extended configuration, an internal cavity correspondingly increases in size.

The piston has at least one port through which, as the cavity increases in size, fluid external the actuator flows into the cavity. The external fluid can include mud, drilling fluid, or any other fluid external the piston, actuator or otherwise present within the wellbore. Accordingly, rather than drawing oil from the compensator or other container to fill the expanding cavity, fluid that is readily available downhole can be employed instead. As a result, the size of the compensator (or other fluid container) can be correspondingly decreased.

Further, the fluid barrier can be provided with a scraper and/or wiper for cleaning the piston and preventing excess buildup.

Figure 1A:
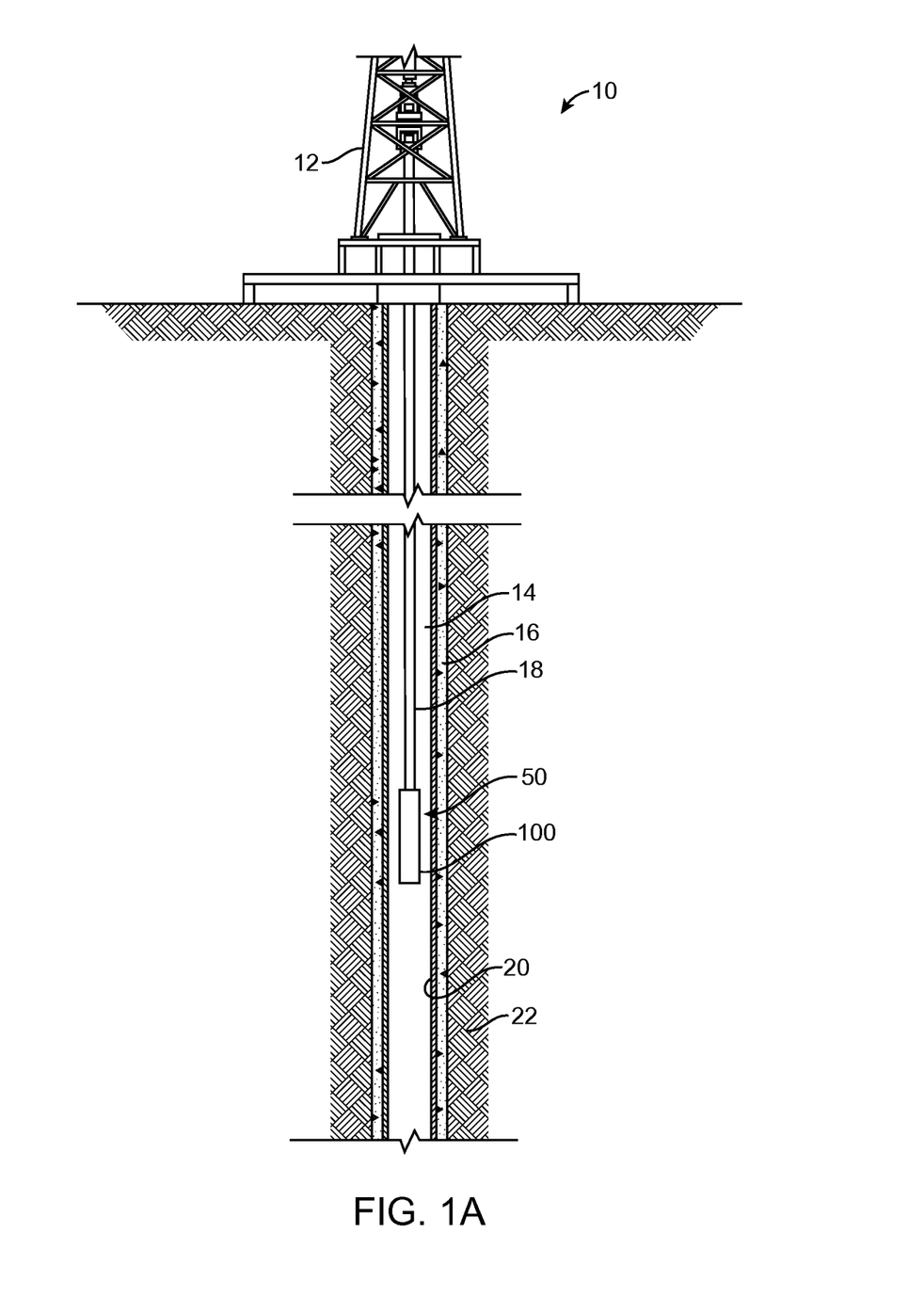
FIG. 1A is a diagram illustrating an exemplary environment for an actuator according to the present disclosure.

The actuator can be employed in an exemplary wellbore system 10 shown, for example, in FIG. 1A. A system 10 for anchoring a downhole tool in a wellbore includes a drilling rig 12 extending over and around a wellbore 14. The wellbore 14 is within an earth formation 22 and has a casing 20 lining the wellbore 14, the casing 20 is held into place by cement 16. An actuator 100 can be employed as part of a downhole tool 50. The downhole tool 50 can be moved down the wellbore 14 via a conveyance 18 to a desired location. A conveyance 18 can be, for example, tubing-conveyed, wireline, slickline, work string, coiled tubing, or any other suitable means for conveying downhole tools into a wellbore. Once the downhole tool 50 reaches the desired location the actuator 100 may be deployed.

It should be noted that while FIG. 1A generally depicts a land-based operation, those skilled in the art would readily recognize that the principles described herein are equally applicable to operations that employ floating or sea-based platforms and rigs, without departing from the scope of the disclosure. Also, even though FIG. 1A depicts a vertical wellbore, the present disclosure is equally well-suited for use in wellbores having other orientations, including horizontal wellbores, slanted wellbores, multilateral wellbores or the like. Further, the wellbore system 10 can have a casing already implemented while, in other examples, the system 10 can be used in open hole applications.

Figure 1B:
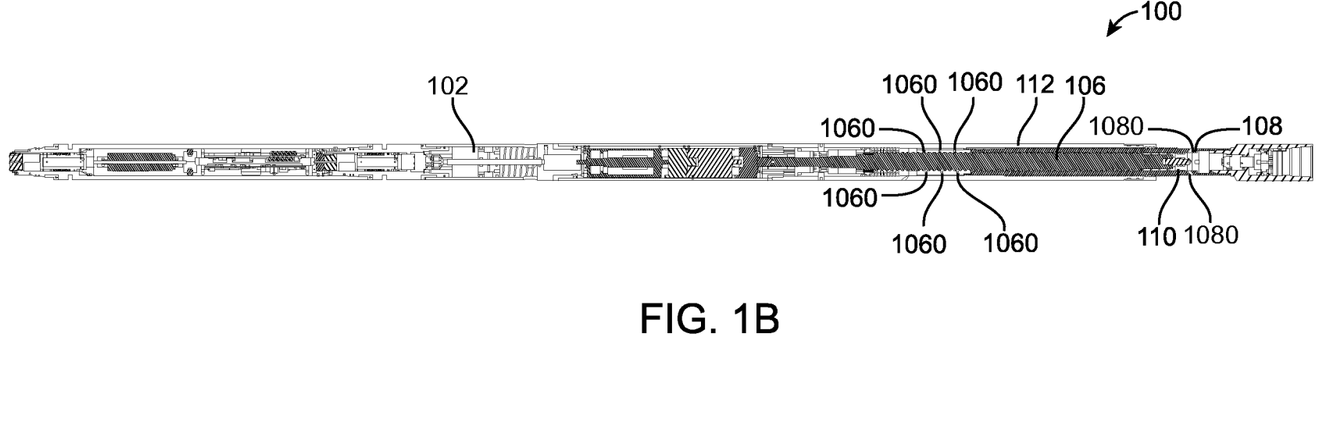
FIG. 1B is a cross-sectional view of an exemplary actuator.

An actuator 100 is illustrated in FIG. 1B. The actuator 100 includes a fluid container 102, a linear actuating shaft 106, and a piston 108. A fluid barrier 110 is coupled to an end of the linear actuating shaft 106 and is at least partially encircled by the piston 108. The fluid container 102 is uphole of the linear actuating shaft 106 and the piston 108. The fluid container 102 stores and provides fluid to the actuator 100. The fluid provided can be oil. The fluid from the fluid container provides pressure balance and lubrication as the actuator 100 deploys. The fluid from the fluid container 102 is provided to the actuator 100 uphole from the fluid barrier 110. The fluid barrier 110 engages an inner surface of the piston 108, preventing fluid communication across the fluid barrier 110. The piston 108 is coupled to the linear actuating shaft 106 such that the piston 108 is movable in a longitudinal direction between an extended configuration and a retracted configuration upon rotation of the linear actuating shaft 106.

Figure 2A:
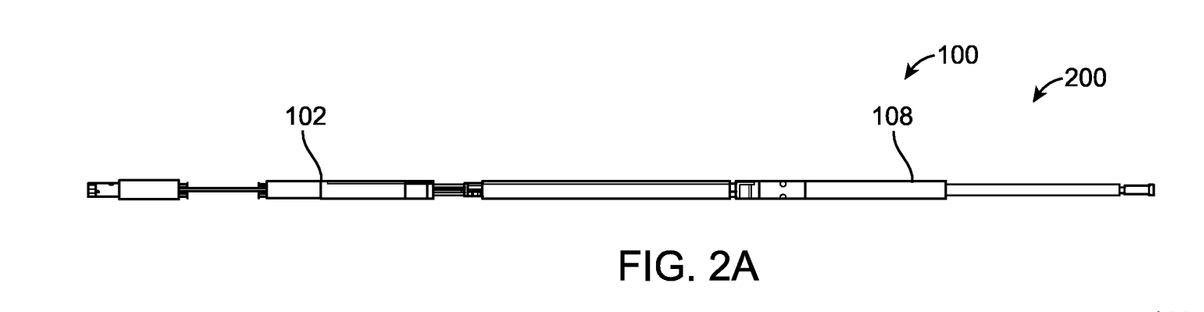
FIG. 2A is a diagram illustrating an exemplary actuator in a retracted configuration.
Figure 2B:
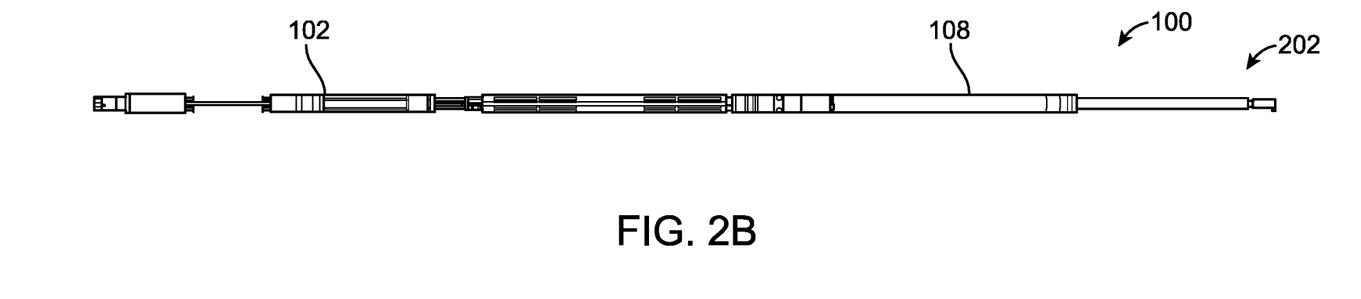
FIG. 2B is a diagram illustrating an exemplary actuator in an extended configuration.

FIG. 2A illustrates the actuator 100 in a retracted configuration 200. As the linear actuating shaft 106 (shown in FIG. 1B) rotates, the rotating movement is converted to linear movement by the at least one converter 1060 (shown in FIG. 1B), and the piston 108 moves longitudinally outward. The at least one converter 1060 can be a ball screw nut. As the linear actuating shaft 106 rotates, the converter 1060 moves linearly and consequentially moves the piston 108 linearly. The actuator 100 then shifts to the extended configuration 202, as illustrated in FIG. 2B. As the actuator 100 is in the retracted configuration 200, a volume of fluid, such as oil, is contained within the actuator 100. For example, the volume of fluid within the actuator 100 can be about 193 cubic inches (and may range from 180-200 cubic inches). However, the fluid is compressed when exposed to the pressures downhole in a wellbore. For example, the fluid, when downhole, can be compressed by about 15%. As such, the fluid container 102 would need to store about 15% less fluid in the actuator 100. Thus, when in the retracted configuration 200, the fluid container would need to store about 29 cubic inches more fluid to compensate for the compressed oil when downhole.

However, when the actuator 100 is in the extended configuration 202, the volume of fluid needed then is greater to fill in expanded actuator 100. Referring back to the example above, the volume of fluid needed when in the retracted configuration 200 is 193 cubic inches. When in the extended configuration 202, the volume of fluid required is increased to 309 cubic inches, which means an additional 116 cubic inches. This amount also would be adjusted to compensate for compression downhole. For example, if 116 cubic inches is needed when the actuator 100 is downhole, the additional volume provided when uphole would be 133.4 cubic inches.

Figure 3A:
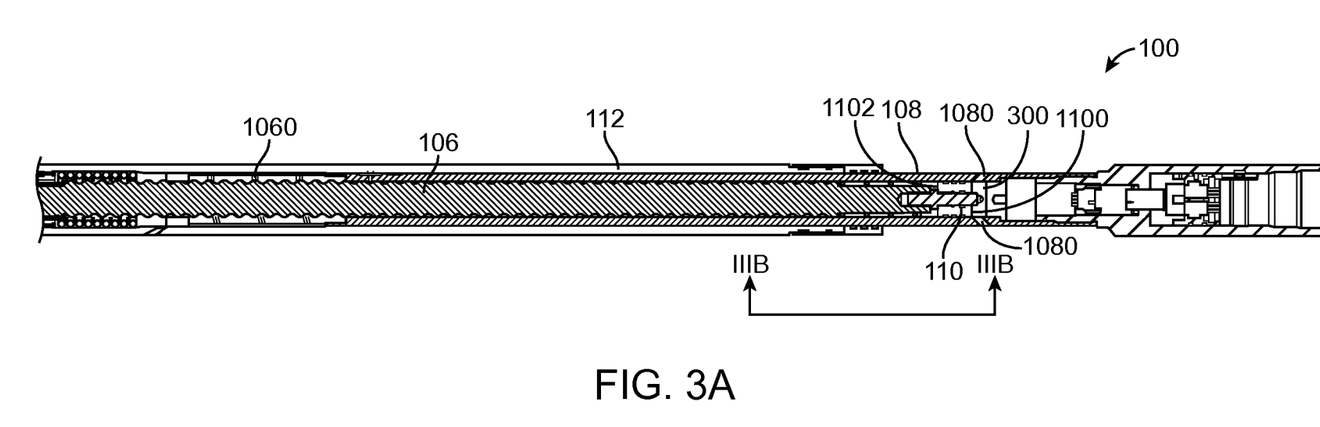
FIG. 3A is a cross-sectional view of a portion of an exemplary actuator.

Instead of increasing the size of the fluid container 102 to compensate for the actuator 100 in the extended configuration 202, the piston 108 has a port 1080 formed therein, as illustrated in FIG. 3A. As the piston 108 moves to the extended configuration 202, a cavity 300 which is formed between the piston 108 and a fluid facing side 1100 of the fluid barrier 110 expands. Further, as the piston 108 moves to the retracted configuration 200, the cavity 300 contracts. The expansion of the cavity 300 results in extra volume in the actuator 100 when the actuator 100 is in the extended configuration 202. The port 1080 extends from external the piston 108 to the cavity 300. The port 1080 thereby permits fluid communication between the cavity 300 and external the piston 108, such that fluid can enter the cavity 300 during extension of the piston 108 and exit the cavity 300 during retraction of the piston 108. In at least one example, the port 1080 permits fluid communication between the cavity 300 and external the actuator 100. The fluid external the piston 108 can be mud, drilling fluid, or any other fluid available downhole in the wellbore. The actuator 100 can include one port 1080 or a plurality of ports 1080.

The use of the fluid external the piston 108 compensates for the extra volume of fluid needed when the actuator 100 is in the extended configuration 202. Thus, the fluid container 102 does not have to be increased in size to accommodate for the extra volume of fluid used while the actuator 100 is in the extended configuration 202. The fluid container 102 can be merely sized to store enough fluid to compensate for the compression of the fluid when the actuator 100 is downhole in the wellbore.

Figure 3B:
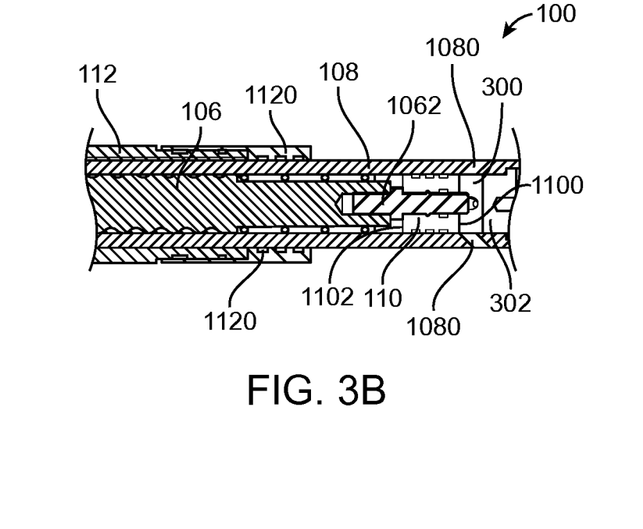
FIG. 3B is an enlarged cross-sectional view of portion IIIB-IIIB of FIG. 3A.

As illustrated in FIG. 3B, the actuator 100 also includes an outer seal 1120 which prevents fluid from entering the actuator 100 through the junction between the piston 108 and the housing 112. The outer seal 1120 engages an outer surface of the piston 108 and can also scrape and clean the outer surface of the piston 108 as the piston 108 moves between the retracted configuration 200 and the extended configuration 202. Further, the actuator 100 includes a barrier 302 within the piston 108 across the cavity 300 from the fluid facing side 1100 of the fluid barrier 110. The barrier 302 prevents fluid communication with the components within the piston 108.

The linear actuating shaft 106 is coupled to the fluid barrier 110. The fluid barrier 110 has a shaft facing side 1102 which receives the linear actuating shaft 108. In the illustrated example, the linear actuating shaft 106 is coupled to the fluid barrier 110 by a connector 1062. The connector 1062 can be any suitable mechanism to couple the linear actuating shaft 106 with the fluid barrier 110. In other examples, the linear actuating shaft 108 can be directly coupled to the fluid barrier 110.

Figure 4:
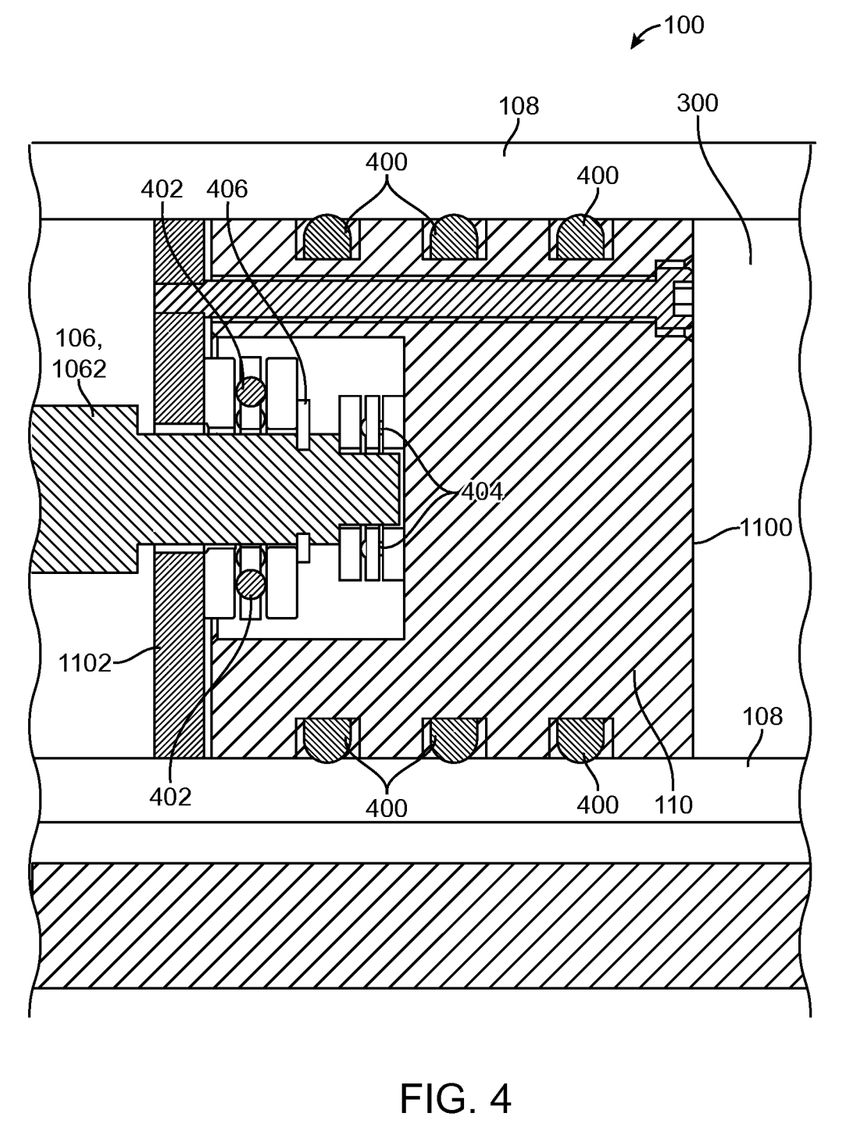
FIG. 4 is an partial, enlarged, cross-sectional view of a diagram of an exemplary actuator.

The linear actuating shaft 106 is received by the fluid barrier 110 through the shaft facing side 1102, as shown in FIG. 4. In the illustrated example, the linear actuating shaft 106 is coupled to the fluid barrier 110 by a connector 1062. In other examples, the linear actuating shaft 106 can be directly coupled to the fluid barrier 110. The connector 1062 is secured by a retainer 406. The retainer 406 can be a retaining ring, an e-clip, or any suitable device that can retain the connector 1062 with the fluid barrier 110. The connector 1062 is also coupled to bearings 402, 404. The bearings 402, 404 remove the rotary torque component of the linear actuating shaft 106 such that the fluid barrier 110 does not rotate but moves in a linear direction. In at least one example, the bearings 402, 404 are thrust bearings. In other examples, the bearings 402, 404 can be any suitable rotary rolling-element bearing such that rotation is permitting between the linear actuating shaft 106 and the fluid barrier 110, but predominately provide a linear force on the fluid barrier 110.

The fluid barrier 110 includes at least one engaging element 400 disposed about its periphery engaging an inner surface of the piston 108. In at least one example, the fluid barrier 110 has one engaging element 400. In other examples, the fluid barrier 110 can have more than one engaging element 400, for example three engaging element 400 as illustrated. The at least one engaging element 400 can be a seal and prevent fluid communication across the fluid barrier 110. In other examples, the engaging elements 400 can be centralizers wherein the centralizers engage with the inner surface of the piston 108 to maintain the position of the fluid barrier 110. For example, at least one of the engaging elements 400 can be a wear ring. In yet other examples, at least one of the engaging elements 400 can also be scrapers such that when the fluid barrier 110 moves relative to the piston 108, the engaging elements 400 scrape and clean the inner walls of the barrier 110. The engaging elements 400 can each have a different function. As illustrated, one engaging element 400 can have a fluid barrier function, one engaging element 400 can have a centralizer function, and one engaging element 400 can have a scraper function. The combination and order of functions of the engaging elements 400 can vary. Further, with different functions, the engaging elements 400 can be made of different materials. For example, if functioning as a seal, the engaging element 400 can be made of an elastomer or any suitable material that prevents fluid communication across the fluid barrier 110.

Figure 5:
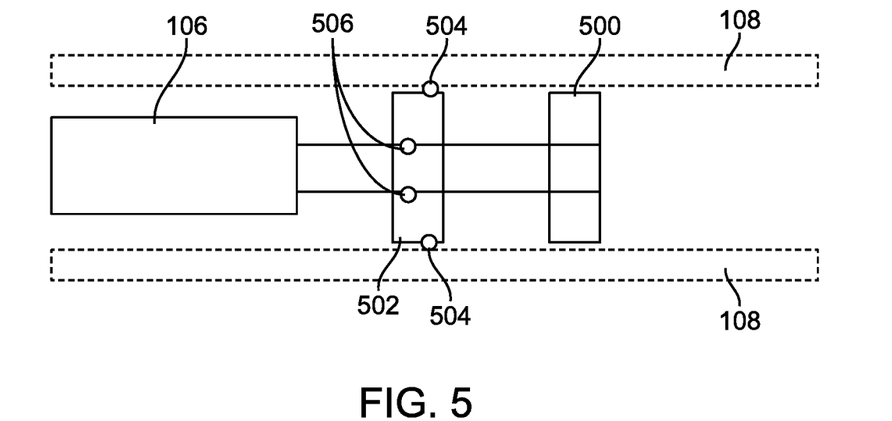
FIG. 5 is a diagram illustrating another embodiment of an exemplary actuator.

FIG. 5 illustrates another embodiment of an actuator. The linear actuating shaft 106 is substantially similar to that described above and employs a ball screw. A wiper 500 and a sealer 502 are coupled to the linear actuating shaft 106. The wiper 500 is coupled to the linear actuating shaft 106 downhole of the sealer 502. The wiper 500 engages the inner walls of a piston 108. As the piston 108 moves relative to the wiper 500, the wiper 500 scrapes and cleans the inner walls of the piston 108; thus, the wiper 500 can clear fluid such as mud that may be within the piston 108. The sealer 502 also engages the inner walls of the piston 108, thereby preventing fluid communication across the sealer 502. The sealer 502 includes an outer ring 504 which engages the piston 108. In at least one example, the outer ring 504 can be an o-ring. An inner ring 506 is coupled to the sealer 502 and the linear actuating shaft 106. In at least one example, the inner ring 506 can be an o-ring. The outer ring 504 exerts more frictional torque than the inner ring 506. As such, while the linear actuating shaft 106 rotates, the sealer 502 does not rotate but moves in a linear direction.

Figure 6:
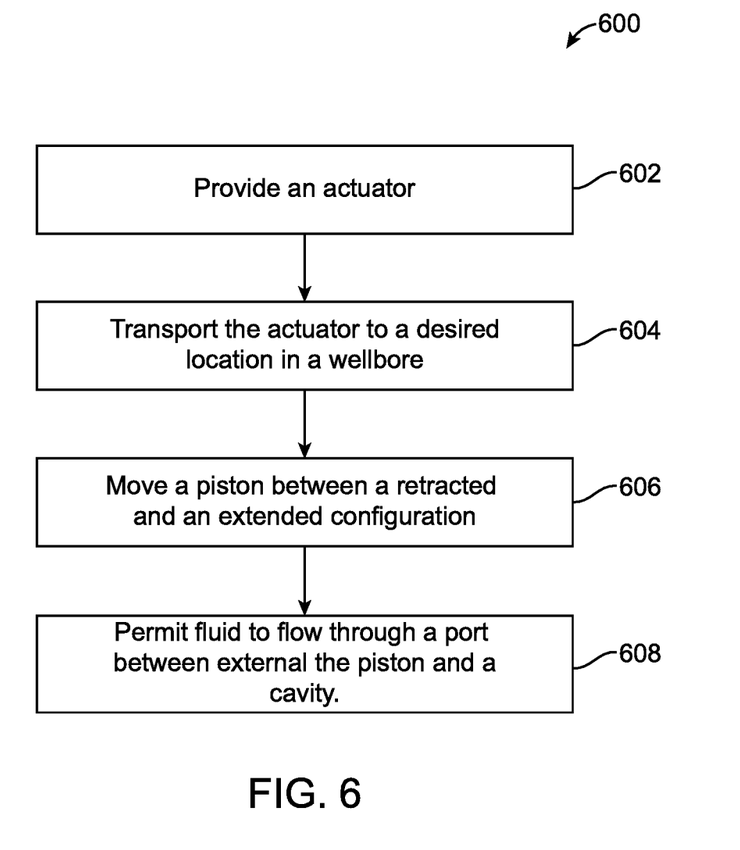
FIG. 6 is a flow chart of a method for utilizing an exemplary actuator.

Referring to FIG. 6, a flowchart is presented in accordance with an example embodiment. The method 600 is provided by way of example, as there are a variety of ways to carry out the method. The method 600 described below can be carried out using the configurations illustrated in FIGS. 1-5, for example, and various elements of these figures are referenced in explaining example method 600. Each block shown in FIG. 6 represents one or more processes, methods or subroutines, carried out in the example method 600. Furthermore, the illustrated order of blocks is illustrative only and the order of the blocks can change according to the present disclosure. Additional blocks may be added or fewer blocks may be utilized, without departing from this disclosure. The example method 600 can begin at block 602.

At block 602, an actuator is provided. The actuator includes a fluid container, a linear rotating shaft, a fluid barrier coupled to the linear rotating shaft, and a piston. A cavity is formed between the fluid barrier and the piston. The piston has at least one port disposed therein; the port permits fluid communication between external the piston and the cavity.

At block 604, the actuator is transported to a desired location in a wellbore. The actuator is coupled to a downhole tool which is coupled to a conveyance. The conveyance can be, for example, tubing-conveyed, wireline, slickline, work string, coiled tubing, or any other suitable means for conveying downhole tools into a wellbore.

Once the actuator is at the desired location, at block 606, the piston is moved between a retracted and an extended configuration. The linear actuating shaft is rotated, thereby causing the piston to move in a linear direction. The fluid barrier is coupled to the linear actuating shaft such that, while the linear actuating shaft rotates, the fluid barrier does not rotate but moves longitudinally relative to the piston. The fluid barrier engages the inner walls of the piston, preventing fluid communication across the fluid barrier.

As the piston shifts towards the extended configuration, at block 608, fluid flows between external the piston and the cavity through the port. The fluid can be mud, drilling fluid, or any fluid readily available downhole external the piston. The fluid fills the cavity, thereby providing pressure balance. Thus, the fluid container of the actuator can be decreased in size as fluid does not have to be stored in the actuator to fill the cavity—fluid that is already downhole is used instead. Further, as the piston moves between the extended configuration and the retracted configuration, the fluid barrier scrapes and cleans the inner walls of the piston.

Numerous examples are provided herein to enhance understanding of the present disclosure. A specific set of statements are provided as follows.

Statement 1: An actuator comprising: a housing; a linear actuating shaft disposed within the housing; a piston coupled with the linear actuating shaft, the piston being movable in a longitudinal direction between an extended configuration and a retracted configuration upon rotation of the linear actuating shaft; a fluid barrier disposed on an end of the linear actuating shaft and encircled by the piston, the fluid barrier engaging an inner surface of the piston preventing fluid communication across the fluid barrier, the fluid barrier having a shaft engaging side which receives the linear actuating shaft and a fluid facing side; and a cavity formed between the piston and the fluid facing side, and which expands when the piston moves to the extended configuration and contracts when the piston moves to the retracted configuration, wherein a port is disposed in the piston and extends from the cavity to external the piston thereby permitting fluid communication between the cavity and external the piston.

Statement 2: An actuator is disclosed according to Statement 1, wherein the linear actuating shaft comprises a ball screw.

Statement 3: An actuator is disclosed according to Statements 1-2, wherein the fluid barrier comprises a seal disposed about its periphery engaging an inner surface of the piston.

Statement 4: An actuator is disclosed according to Statements 1-3, wherein the fluid barrier further comprises at least one of a scraper, a centralizer, or a combination thereof.

Statement 5: An actuator is disclosed according to Statements 1-4, wherein the linear actuating shaft is coupled with the fluid barrier via a bearing.

Statement 6: An actuator is disclosed according to Statements 1-5, wherein when the cavity expands, fluid from external the piston flows through the port into the cavity.

Statement 7: An actuator is disclosed according to Statement 6, wherein the fluid comprises mud.

Statement 8: A system comprising: an actuator disposed in a wellbore, the actuator comprising: a housing; a linear actuating shaft disposed within the housing; a piston coupled with the linear actuating shaft, the piston being movable in a longitudinal direction between an extended configuration and a retracted configuration upon rotation of the linear actuating shaft; a fluid barrier disposed on an end of the linear actuating shaft and encircled by the piston, the fluid barrier engaging an inner surface of the piston preventing fluid communication across the fluid barrier, the fluid barrier having a shaft engaging side which receives the linear actuating shaft and a fluid facing side; and a cavity formed between the piston and the fluid facing side, and which expands when the piston moves to an extended configuration and contracts when the piston moves to the retracted configuration, wherein a port is disposed in the piston and extends from the cavity to external the piston thereby permitting fluid communication between the cavity and external the piston.

Statement 9: A system is disclosed according to Statement 8, wherein the linear actuating shaft comprises a ball screw.

Statement 10: A system is disclosed according to Statements 8-9, wherein the fluid barrier comprises a seal disposed about its periphery engaging an inner surface of the piston.

Statement 11: A system is disclosed according to Statements 8-10, wherein the fluid barrier further comprises at least one of a scraper, a centralizer, or a combination thereof.

Statement 12: A system is disclosed according to Statements 8-11, wherein the linear actuating shaft is coupled with the fluid barrier via a bearing.

Statement 13: A system is disclosed according to Statements 8-12, wherein when the cavity expands, fluid from external the piston flows through the port into the cavity.

Statement 14: A system is disclosed according to Statement 13, wherein the fluid comprises mud.

Statement 15: A method comprising: providing an actuator, the actuator comprising: a housing; a linear actuating shaft disposed within the housing; a piston coupled with the linear actuating shaft, the piston being movable in a longitudinal direction between an extended configuration and a retracted configuration upon rotation of the linear actuating shaft; a fluid barrier disposed on an end of the linear actuating shaft and encircled by the piston, the fluid barrier engaging an inner surface of the piston preventing fluid communication across the fluid barrier, the fluid barrier having a shaft engaging side which receives the linear actuating shaft and a fluid facing side; and a cavity formed between the piston and the fluid facing side, and which expands when the piston moves to the extended configuration and contracts when the piston moves to the retracted configuration, wherein a port is disposed in the piston and extends from the cavity to external the piston thereby permitting fluid communication between the cavity and external the piston; transporting the actuator to a desired location in a wellbore; rotating the linear actuating shaft to move the piston between the retracted configuration and the extended configuration; and permitting fluid to flow through the port between external the piston and the cavity.

Statement 16: A method is disclosed according to Statement 15, wherein the fluid barrier comprises a seal disposed about its periphery engaging an inner surface of the piston.

Statement 17: A method is disclosed according to Statements 15-16, wherein the fluid barrier further comprises at least one of a scraper, a centralizer, or a combination thereof.

Statement 18: A method is disclosed according to Statements 15-17, wherein when the linear actuating shaft rotates, the fluid barrier does not rotate but moves longitudinally relative to the piston.

Statement 19: A method is disclosed according to Statements 15-18, wherein when the cavity expands, fluid from external the piston flows through the port into the cavity.

Statement 20: A method is disclosed according to Statement 19, wherein the fluid comprises mud.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. An actuator comprising:
a housing;
an externally threaded ball screw disposed within the housing, wherein the externally threaded ball screw does not move linearly in a longitudinal direction with respect to the housing when the externally threaded ball screw is rotated;
a ball screw nut threaded around the externally threaded ball screw and disposed within the housing, wherein the ball screw nut moves linearly in the longitudinal direction with respect to the housing in response to rotation of the externally threaded ball screw;
a piston coupled with the ball screw nut, wherein the piston is sleeved within the housing and around the externally threaded ball screw in the longitudinal direction, wherein the piston is movable with respect to the housing by movement of the ball screw nut in the longitudinal direction between an extended configuration in which the piston extends out of the housing and a retracted configuration upon rotation of the externally threaded ball screw;
a fluid barrier disposed between the externally threaded ball screw and the piston, the fluid barrier engaging an inner surface of the piston preventing fluid communication across the fluid barrier, the fluid barrier having a screw engaging side which receives the externally threaded ball screw and a fluid facing side;

a cavity formed between the piston and the fluid facing side, wherein the cavity expands when the piston moves to the extended configuration and contracts when the piston moves to the retracted configuration; and a port disposed within the cavity and extending from the cavity to external the piston, wherein the port permits fluid communication between the cavity and external the piston, such that, as the piston moves longitudinally outward from a retracted configuration toward an extended configuration, fluid external the piston flows into the cavity.

2. The actuator of claim 1, wherein the fluid barrier comprises a seal disposed about its periphery engaging an inner surface of the piston.

3. The actuator of claim 1, wherein the fluid barrier further comprises at least one of a scraper, a centralizer, or a combination thereof.

4. The actuator of claim 1, wherein the externally threaded ball screw is coupled with the fluid barrier via a bearing.

5. The actuator of claim 1, wherein when the cavity expands, fluid from external the piston flows through the port into the cavity.

6. The actuator of claim 5, wherein the fluid comprises mud.

7. A system comprising:
an actuator disposed in a wellbore, the actuator comprising:
a housing;
an externally threaded ball screw disposed within the housing, wherein the externally threaded ball screw does not move linearly in a longitudinal direction with respect to the housing when the externally threaded ball screw is rotated;
a ball screw nut threaded around the externally threaded ball screw and disposed within the housing, wherein the ball screw nut moves linearly in the longitudinal direction with respect to the housing in response to rotation of the externally threaded ball screw;
a piston coupled with the ball screw nut, wherein the piston is sleeved within the housing and around the externally threaded ball screw in the longitudinal direction,
wherein the piston is movable with respect to the housing by movement of the ball screw nut in the longitudinal direction between an extended configuration in which the piston extends out of the housing and a retracted configuration upon rotation of the externally threaded ball screw;
a fluid barrier disposed between the externally threaded ball screw and the piston, the fluid barrier engaging an inner surface of the piston preventing fluid communication across the fluid barrier, the fluid barrier having a screw engaging side which receives the externally threaded ball screw and a fluid facing side;
a cavity formed between the piston and the fluid facing side, wherein the cavity expands when the piston moves to the extended configuration in which the piston extends out of the housing and contracts when the piston moves to the retracted configuration; and
a port disposed within the cavity and extending from the cavity to external the piston, wherein the port permits fluid communication between the cavity and external the piston, such that, as the piston moves longitudinally outward from a retracted configuration toward an extended configuration, fluid external the piston flows into the cavity.

8. The system of claim 7, wherein the fluid barrier comprises a seal disposed about its periphery engaging an inner surface of the piston.

9. The system of claim 7, wherein the fluid barrier further comprises at least one of a scraper, a centralizer, or a combination thereof.

10. The system of claim 7, wherein the externally threaded ball screw is coupled with the fluid barrier via a bearing.

11. The system of claim 7, wherein when the cavity expands, fluid from external the piston flows through the port into the cavity.

12. The system of claim 11, wherein the fluid comprises mud.

13. A method comprising:
providing an actuator, the actuator comprising:
a housing;
an externally threaded ball screw disposed within the housing, wherein the externally threaded ball screw does not move linearly in a longitudinal direction with respect to the housing when the externally threaded ball screw is rotated;
a ball screw nut threaded around the externally threaded ball screw and disposed within the housing, wherein the ball screw nut moves linearly in the longitudinal direction with respect to the housing in response to rotation of the externally threaded ball screw;
a piston coupled with the ball screw nut, wherein the piston is sleeved within the housing and around the externally threaded ball screw in the longitudinal direction, wherein the piston is movable with respect to the housing by movement of the ball screw nut in the longitudinal direction between an extended configuration in which the piston extends out of the housing and a retracted configuration upon rotation of the externally threaded ball screw;
a fluid barrier disposed between the externally threaded ball screw and the piston, the fluid barrier engaging an inner surface of the piston preventing fluid communication across the fluid barrier, the fluid barrier having a screw engaging side which receives the externally threaded ball screw and a fluid facing side;
a cavity formed between the piston and the fluid facing side, wherein the cavity expands when the piston moves to the extended configuration and contracts when the piston moves to the retracted configuration; and
a port disposed within the cavity and extending from the cavity to external the piston, wherein the port permits fluid communication between the cavity and external the piston, such that, as the piston moves longitudinally outward from a retracted configuration toward an extended configuration, fluid external the piston flows into the cavity;
transporting the actuator to a desired location in a wellbore;
rotating the externally threaded ball screw to move the piston between the retracted configuration and the extended configuration; and
permitting fluid to flow through the port between external the piston and the cavity.

14. The method of claim 13, wherein the fluid barrier comprises a seal disposed about its periphery engaging an inner surface of the piston.

15. The method of claim 13, wherein the fluid barrier further comprises at least one of a scraper, a centralizer, or a combination thereof.

16. The method of claim 13, wherein when the externally threaded ball screw rotates, the fluid barrier does not rotate but moves longitudinally relative to the piston.

17. The method of claim 13, wherein when the cavity expands, fluid from external the piston flows through the port into the cavity.

18. The method of claim 17, wherein the fluid comprises mud.

\* \* \* \* \*